Nov. 29, 1932.　　　E. A. NELSON　　　1,889,692
MANUAL BRAKE CONTROL
Filed Oct. 2, 1931
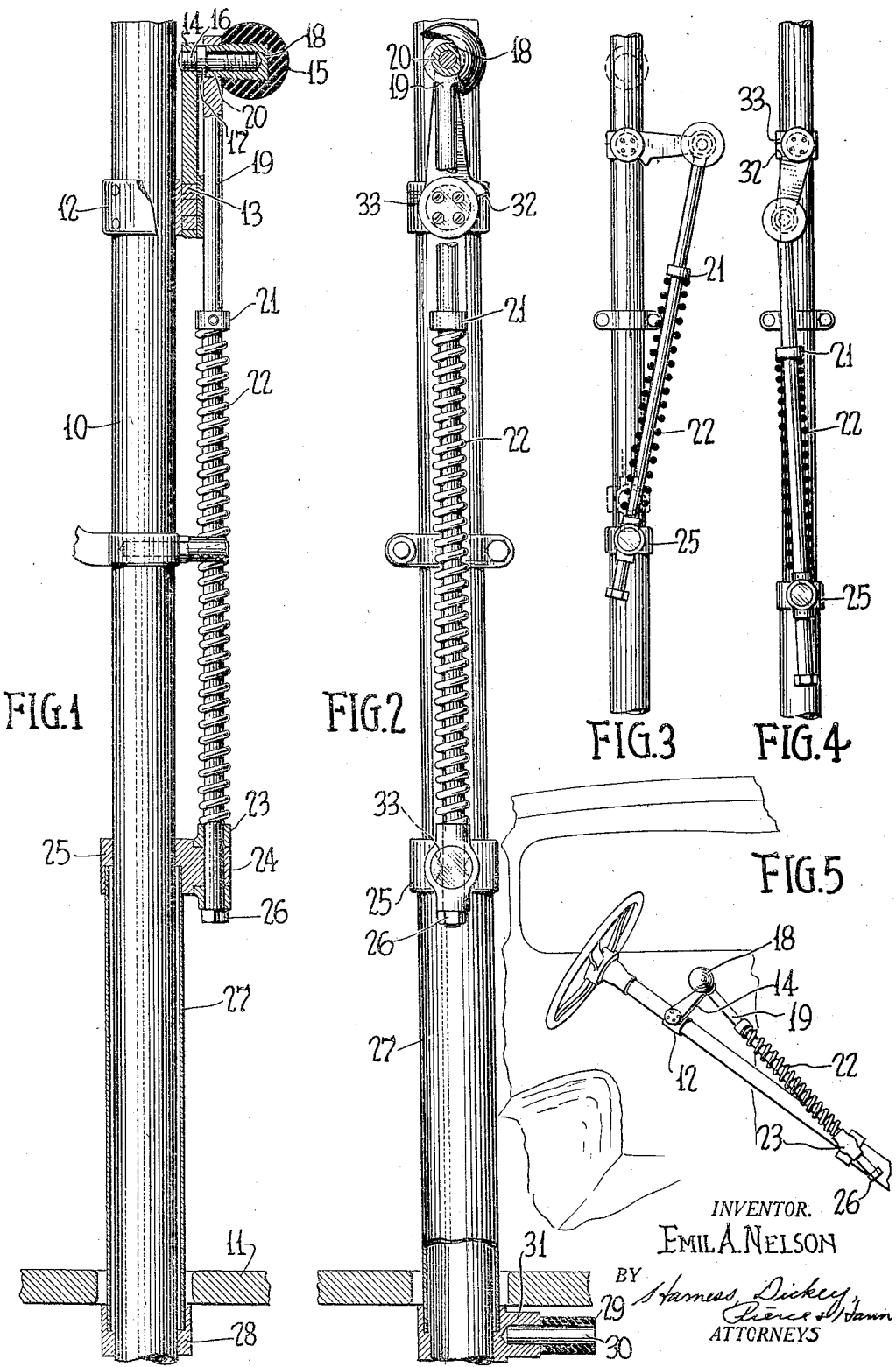
INVENTOR.
Emil A. Nelson
BY
ATTORNEYS Patented Nov. 29, 1932

1,889,692

UNITED STATES PATENT OFFICE

EMIL A. NELSON, OF DETROIT, MICHIGAN

MANUAL BRAKE CONTROL

Application filed October 2, 1931. Serial No. 566,513.

My invention relates to the art of brakes and it has been my particular object to provide an arrangement for the hand or emergency brake of an automobile affording an unobtrusive and yet accessible arrangement for the mounting of the operating handle of such a brake. A further object of my invention has been to devise an arrangement affording a superior locking arrangement for an emergency brake of this type. Further objects and advantages of my invention will be obvious from a reading of the sub-joined specification in the light of the attached drawing, in which, Fig. 1 is a side elevation of the steering post of an automotive vehicle illustrating the application of my improved emergency braking system thereto.

Fig. 2 is a plan view of the same arrangement.

Fig. 3 is a view similar to Fig. 2 illustrating the braking lever in applied but unlocked position.

Fig. 4 is a similar view illustrating the lever in applied and locked position, and Fig. 5 is a view of the interior of the vehicle illustrating the application of my invention thereto.

Referring to the drawing by reference characters, the numeral 10 indicates the steering post of an automotive vehicle which passes through a floor-board 11 at its lower end. A bracket 12 is secured to the steering post adjacent its upper end and is provided with a laterally projecting pivot pin 13 upon which the main actuating lever 14 of an emergency brake may be pivotally mounted. The lever 14 receives adjacent its upper extremity a handle 15 which is secured in place by means of a bolt 16 threaded at its opposite extremities for co-action with complementally threaded portions of the lever 14 and a sleeve 18 respectively, the sleeve 18 being also threaded upon its outer end to receive a complementally threaded portion of the handle. The bolt 16 is provided with a collar 17 intermediate its ends which acts as a limit stop for the sleeve 18.

A link 19 is pivotally received upon the inner extremity of the sleeve 18 at 20 and is interconnected with the operating mechanism of the brake to effect an actuation thereof upon the pivotal movement of the lever 14 about the axis of the pin 13. This link 19 is provided with a collar 21 intermediate its ends which is adapted to confine a coil spring 22 which normally holds the actuating lever in inoperative position. This spring is confined between the collar 21 and a second collar 23 which is swiveled upon a pin 24 which constitutes in turn a part of a sliding bearing 25 adapted to reciprocate along the steering post. The pin 24 is cut away internally as indicated at 33 to afford provision for a certain amount of pivotal movement of the link 19 about the axis of the pin 24. A nut 26 is secured to the lower end of the link 19 and limits the upward movement thereof with respect to the bearing 25.

The bearing 25 is secured to a sleeve 27 which slides therewith longitudinally of the steering post upon the application of the brakes and this sleeve is in turn provided with a second bearing 28 below the point at which the steering post passes through the floor-board. This bearing 28 is provided with an offset boss 31 which receives a pin 30 carrying a roller 29 at its outer end. This roller 29 may be connected with the wheel brakes by any desired system of linkage, but is preferably interconnected therewith by means of an operation connection such as that illustrated in my co-pending application Serial No. 566,512, filed of even date herewith.

The lever 14 is provided at its lower end with a dog 32 which is adapted to abut against a complemental projection 33 upon the bracket 12 to limit the applying movement of the brake. The parts are interrelated in such a way, however, that these projections do not co-act to limit a further applying movement until the lever 14 has been swung through an angle of more than 180 degrees, as illustrated in Fig. 4. There is thus no danger of this abutment occurring before the parts have passed through dead center position.

In the operation of my improved brake the lever 14 normally extends upwardly parallel to the steering post when the brakes are in unapplied position and the link 19 extends parallel to said lever under these conditions, as illustrated in Figs. 1 and 2. When it is desired to apply the brakes the operator grasps the handle 14 and swings the same in a clockwise direction, as indicated in Fig. 2. This effects an arcuate movement of the bearing 20 of the link 19 about the center 13, swinging the link 19 downwardly against the tension of the spring 22 through its bearing in the pin 24. The bearing is thus forced downwardly as is illustrated in Fig. 3, carrying with it the sleeve 27 which in turn carries the lower bearing 28 and the roller 29. The downward movement of this roller in turn effects an application of the links interconnecting it with the brakes of the vehicle.

An ordinary hand application of the brakes is illustrated in Fig. 3 and an application of the brakes to lock the car in position for parking is illustrated in Fig. 4. In this latter figure the operating lever 14 has been swung downwardly beyond its dead center position and the tendency of the spring 22 is therefore to force it upwardly in a clockwise direction. This tendency is, however, limited by the projections 32 and 33 referred to above and the spring thus normally holds the lever releasably locked in applying position. When the lever is in this position it is only necessary to force it in a counter-clockwise direction against the spring tension to a position fairly beyond dead center position in order to release the brakes.

Modifications will be obvious to those skilled in the art and I do not therefore wish to be limited except by the scope of my subjoined claims as interpreted in the light of the generic spirit of my invention.

I claim:

1. Brake actuating mechanism including, in combination, a steering post, an applying lever, a sleeve telescoped about said steering post and slidable longitudinally thereof to effect an application of the brakes, and a yieldable connection from said lever to said sleeve.

2. An element of a brake applying system comprising, in combination, a sleeve telescoped about the steering post of a vehicle and slidable longitudinally thereof, and a roller secured to the base of said sleeve and interconnected with the linkage to the brakes.

3. Brake actuating mechanism, including, in combination, a steering post and a pivotally mounted brake applying lever secured to said post, a link pivotally secured to said applying lever, a sleeve slidably disposed about the steering post and yieldably connected to said link, said sleeve being interconnected with the brakes of the vehicle.

4. Brake actuating mechanism including, in combination, a steering post and a pivotally mounted brake applying lever secured to said post, a link pivotally secured to said applying lever, a sleeve slidably telescoped about said post, said link passing through a portion of said sleeve, an abutment intermediate the ends of said link, and a compression spring interposed between said abutment and said sleeve whereby to effect a reciprocation of the sleeve along the steering post upon pivotal movement of the brake applying lever.

5. Brake actuating mechanism including, in combination, a pivotally mounted brake applying lever, a link pivotally secured to said applying lever, a slidably mounted sleeve, and yieldable means connecting said sleeve to said link, said sleeve being interconnected with the brakes of the vehicle.

6. Brake actuating mechanism including, in combination, a pivotally mounted brake applying lever, a link pivotally secured to said applying lever, a slidably mounted sleeve, said link passing through a portion of said sleeve, an abutment intermediate the ends of said link, and a compression spring interposed between said abutment and said sleeve whereby to effect a reciprocation of the sleeve upon pivotal movement of the brake applying lever.

7. Brake actuating mechanism including, in combination, a steering post, an applying lever, engageable abutments on said post and said lever, a sleeve telescoped about said steering post and slidable longitudinally thereof to effect an application of the brake, and a yieldable connection from said lever to said sleeve for urging said abutments into engagement upon movement of the lever beyond a predetermined point.

8. Brake actuating mechanism including, in combination, a steering post and a pivotally mounted brake-applying lever secured to said post, a link pivotally secured to said applying lever, a sleeve slidably disposed about the steering post, and yieldable means connecting said sleeve to said link for biasing said applying lever to its extreme position of release and application.

9. Brake applying mechanism including, in combination, a steering post, an applying lever, engageable abutments on said post and said lever, a sleeve telescoped about said steering post and slidable longitudinally thereof to effect an application of the brake, and yieldable means connecting said applying lever to said sleeve for biasing said applying lever to a releasably locked position of brake application, with said abutments in engagement, upon movement of the lever beyond a predetermined point.

In testimony whereof I hereunto affix my signature.

EMIL A. NELSON.